United States Patent [19]

Sontheimer

[11] 4,210,368
[45] Jul. 1, 1980

[54] TRACTOR-TRAILER AIR-BRAKE SYSTEM

[75] Inventor: Georg Sontheimer, Ulm, Fed. Rep. of Germany

[73] Assignee: BVT Beratungs-, Verwaltungs- und Treuhandgesellschaft mbH, Düsseldorf, Fed. Rep. of Germany

[21] Appl. No.: 929,955

[22] Filed: Aug. 1, 1978

[30] Foreign Application Priority Data

Aug. 9, 1977 [DE] Fed. Rep. of Germany ....... 2735748

[51] Int. Cl.² .......................................... B60T 13/74
[52] U.S. Cl. ............................................ 303/3; 303/7
[58] Field of Search .......................... 303/7, 3, 20, 2, 4; 188/273; 123/97 B, 98

[56] References Cited
U.S. PATENT DOCUMENTS

| 3,085,835 | 4/1963 | Alfieri | 303/3 |
| 3,302,758 | 2/1967 | Gordon | 303/3 |
| 3,747,992 | 7/1973 | Schnipke | 303/7 |

Primary Examiner—Trygve M. Blix
Assistant Examiner—Reinhard J. Eisenzopf
Attorney, Agent, or Firm—Karl F. Ross

[57] ABSTRACT

A tractor-trailer brake system has a tractor engine brake which can be turned on to brake the tractor, and which operates a switch that can open a valve in the air line to the trailer brakes to allow simultaneous energization of these trailer brakes. A timer is interposed between the switch and the solenoid valve in the air line to periodically close this valve and allow cooling off of the trailer disk brakes for several seconds while the tractor engine brake remains on. The ratio of on time to off time of the solenoid valve during operation of the tractor engine is at least 10:1.

7 Claims, 4 Drawing Figures

TRACTOR-TRAILER AIR-BRAKE SYSTEM

FIELD OF THE INVENTION

The present invention relates to a continuous-duty brake actuator for a tractor-trailer brake system. More particularly this invention concerns an air-operated disk-brake system.

BACKGROUND OF THE INVENTION

A tractor-trailer brake system can basically comprise wheel brakes on the tractor and trailer as well as an engine brake on the tractor. A foot pedal operates the service brake which simultaneously applies all of the wheel brakes. For a long downhill run a continuous-duty brake, normally actuated by hand, may be set which operates the engine brake on the tractor and the wheel brakes on the trailer, the latter normally via a solenoid valve which can be provided on the tractor or on the trailer in the air line to the trailer brakes.

Such a brake system is required in some jurisdictions by law in all tractor-trailers over nine tons gross axle weight. Such a brake retards the downhill travel of a tractor-trailer and is operated normally on long slopes.

The main difficulty with such a split system is that the retardation force of the engine brake in the tractor and of the wheel brakes on the trailer do not maintain a fixed relationship to each other. The principal cause of this is that the engine typically operates with a uniform retardation force, whereas the retardation force of the tractor brakes varies.

More particularly in drum wheel brakes the retardation force decreases after long periods of brake operation. This is caused by thermal swelling of the brake drums which therefore move away from the brakeshoes and decrease the pressure inside the corresponding brakeshoe cylinders. The results is decreased retardation force, known as brake fade.

With disk brakes the opposite effect is noticed. More particularly after some operation the disk clamped between the brakehsoes swells and forces itself into more tight contact with these brakeshoes, thereby increasing the pressure in the cylinders behind them and correspondingly increasing the braking force.

Obviously when descending long hills it is essential that the braking force remain uniformly distributed between the tractor and the trailer. If the braking increases in the trailer considerable tension strain will be exerted on the coupling—fifth wheel or trailer hitch—between the tractor and the trailer. If the retardation force of the trailer brakes decreases the trailer will ride up on the tractor so as not only to overload its brakes, but to make a jackknife whereby the trailer runs partially past the tractor possible.

In drum-brake systems the above-described brake fade cannot be eliminated. The regulations in some jurisdictions allow a 40% fade when the continuous-duty brake has been operated continuously for 6 km. Thus it is normal procedure for the driver to periodically assist the continuous-duty brake at least at the end of a long downhill run by means of his or her service brake. This operation of the service brake, which is effective at least in the trailer on the same wheel brakes as are used for the continuous-duty brake, only aggravates any brake fade in the trailer brakes, greatly increasing the possibility of a jackknife. It is also not unknown for such brakes to become so very overheated in the trailer that the drum literally splits apart, resulting in serious accident.

In a split air-brake system using disk-type wheel brakes the driver must normally switch the continuous-duty brake off toward the end of a long downhill run as the braking force inside the rear disk brakes can become excessive. More frequently the driver switches the continuous-duty brake in and out during a long downhill run, giving the trailer disk brakes some time to cool off. This has the effect of greatly stressing the coupling between the tractor and the trailer, as the switching in and out of the rear trailer brakes whose kinetic retardation force may be greater or less than that of the engine brake in the tractor can occasionally lead to an accident wherein the tractor and trailer separate from each other. Furthermore when the continuous-duty brake is switched off to allow the trailer wheel brakes to cool the tractor engine brake is also switched off, thereby allowing the tractor-trailer to gain considerable momentum. In this situation the driver must operate the service brake so that in effect the trailer disk brakes are afforded little time to cool off.

OBJECTS OF THE INVENTION

It is therefore an object of the present invention to provide an improved tractor-trailer brake system.

Another object of this invention is to provide such a brake system employing air-type disk brakes in the trailer at least.

A further object is to provide an improved operator for such a brake system which is split so as to have a service brake and a continuous-duty brake as described above.

Finally an object is to provide a system for actuating such a split brake system wherein the retardation-force variations are minimized but the system does not add prohibitively to the manufacture costs of the vehicle.

SUMMARY OF THE INVENTION

These objects are attained in a tractor-trailer air-brake system according to the invention which is provided with a timer connected to the electrically operated valve that is opened for pressurizing and energizing the trailer wheel brakes on energization of the tractor engine brake. This timer periodically closes the valve for the trailer wheel brakes even while the tractor brake is energized, giving these trailer wheel brakes a brief period of time to cool off. During such shutting-down of the trailer wheel brakes when the continuous-duty brake is actuated only the trailer continuous-duty brake system is temporarily shut down.

The system according to the instant invention has been found extremely effective in that brake fade is minimized even during very long downhill runs. In fact the braking force remains effectively constant during the entire downhill run so that the driver is completely freed of the necessity of either augmenting the continuous-duty brake by operating the service brake, or periodically switching the continuous-duty brake off so that it can cool somewhat.

In accordance with a particular feature of this invention the timer means is set up so that it maintains the valve closed for substantially longer than it maintains the valve open. In fact the ratio between the length of time closed and the length of time open for the valve is established by the timer to be at least 5:1 and under normal circumstances is set at about 10:1, with the open time generally at 3 seconds.

According to the instant invention the timer means is in fact constituted as a simple sealed unit which is connected in the hot line that is energized when the continuous-duty brake is turned on. Thus when the continuous-duty brake is turned on electricity is fed to the timer means which then establishes the on and off pahses of the valve that is connected in the air line going to the wheel brakes of the trailer.

SPECIFIC DESCRIPTION

Figure 1:
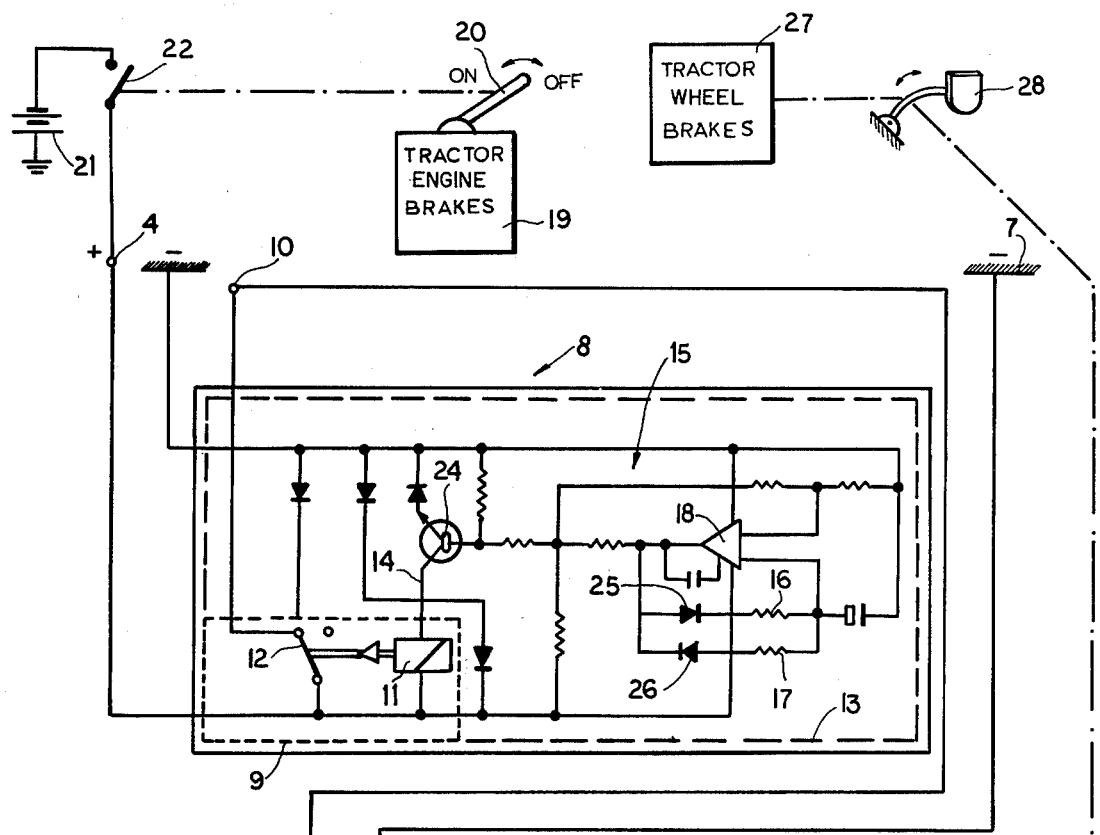
FIG. 1 is a largely schematic diagram illustrating the brake system according to the instant invention.
Figure 1:
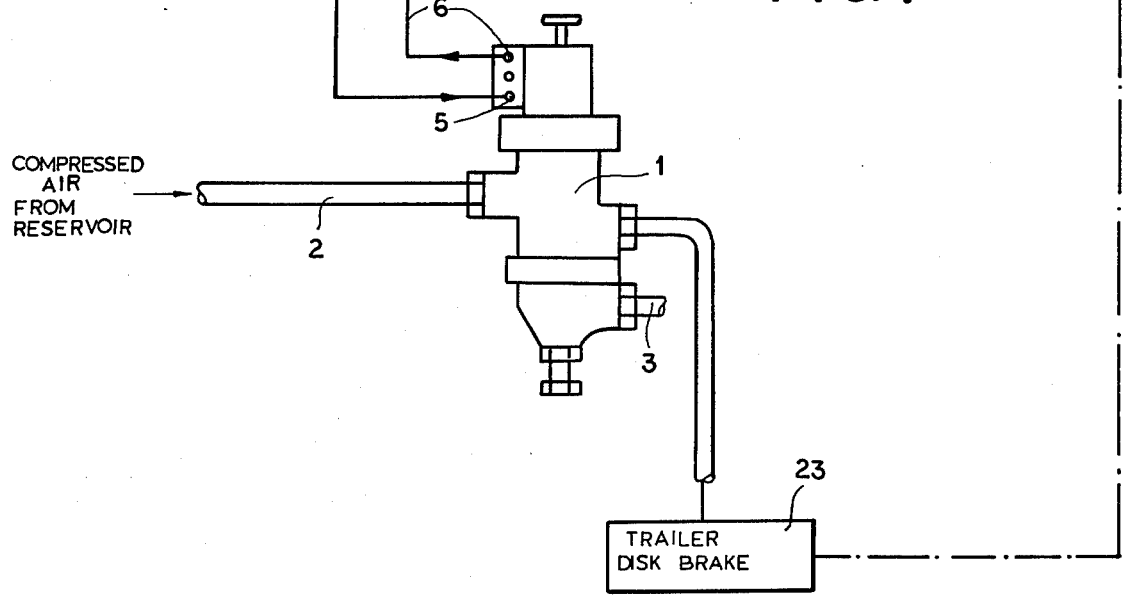

As shown in FIG. 1 a standard split tractor-trailer brake system has a tractor engine brake 19 operable by means of a normally hand-operated actuating lever 20 that also acts on a switch 22 connected between a source 21 of electrical energy and a solenoid valve 1. The tractor also has wheel brakes 27 controlled by a service-brake pedal 28. The valve 1 is in turn connected between a line 2 leading from a source of compressed air and a pair of lines 3 each leading to a respective trailer disk brake such as described in the commonly owned and copending application Ser. No. 888,328 filed Mar. 20, 1978. The system has a hot terminal 4 connected in a prior-art arrangement directly to a hot terminal 5 of the valve 1 and a ground terminal 7 normally connected to the ground terminal 6 of this valve 1.

According to the instant invention an operator or timer circuit 8 constituted as a single construction unit 13 is connected on one side to the hot terminal 4 of the switch 22 and on the other side via an output terminal 10 to the hot terminal 5 of the valve 1. This device 8 is also connected to the negative or ground terminal.

In accordance with the invention the timer device 8 has a switching transistor 24 whose collector 14 is connected to a switching relay 11 having a pole 12 which when lying against its back contact in the normal rest position connects the terminals 4 and 10 together and thereby connects the hot terminal 5 of the valve 1 to the terminal 4 which may be energized by the switch 22. When the pole 12 engages the front contact of the switch 9 of the circuit 8 it opens this connection to de-energize the valve 1 and interrupt flow from the line 2 to the line 3 with simultaneous depressurization of the line 3.

The switching transistor 24 is in turn connected to an operational amplifier 18 of a timer circuit 15 having a pair of feedback resistors 16 and 17 connected in parallel but with respective oppositely effective diodes 25 and 26 for operation of this amplifier 18 as an oscillator whose conducting times and nonconducting times can be adjusted independently of each other by means of the resistors 16 and 17.

Figure 2:
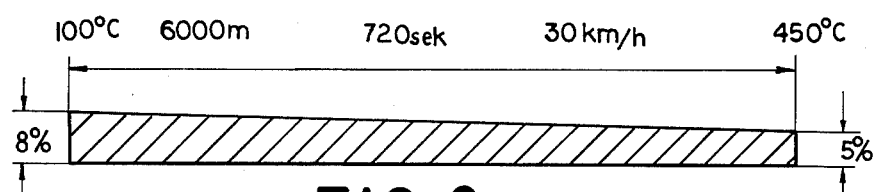
FIG. 2 is a graph illustrating the operation of a standard brake system.

As shown in FIG. 2 regulations in many jurisdictions require that with an 8% retardation force relative to the pressure the vehicle exerts on the ground measured at the start of brake operation it is possible to sink to a retardation force of 5% after travel of the vehicle at 30 km/h through 600 m in 720 seconds. During such a braking operation the temperature of the brake will normally increase from 100° C. to 450° C. Such a braking operation effects work of approximately 1,650,000 mkp (kilopond=kilogram−force) which is equivalent to a load of approximately 30 European horsepower. A brake having the characteristics shown in FIG. 2 satisfies most regulations.

Figure 3:
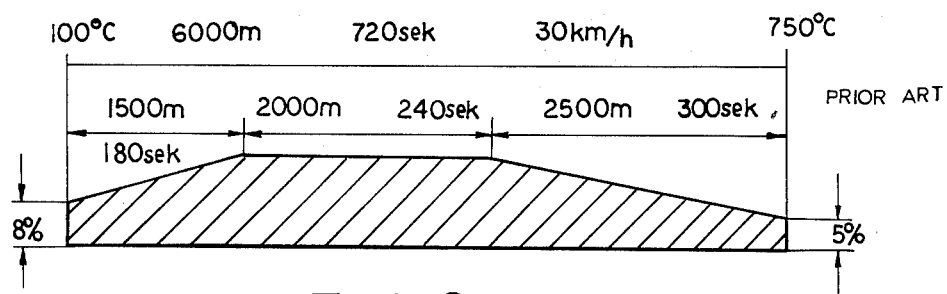
FIG. 3 is a graph illustrating the operation of a prior-art unregulated disc-brake system.
Figure 4:
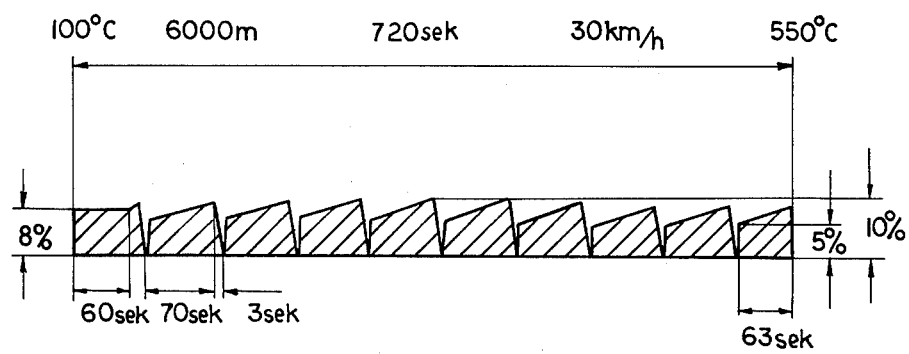
FIG. 4 is a graph similar to FIG. 3 showing the operation of the system according to this invention.

FIG. 3 shows a standard unregulated disk brake which after actuation at an 8% level as described above will temporarily increase its retardation force until this force eventually fades to approximately 5%. In between these two limits the retardation force increases and with it increases the temperature of the brake disk whih can reach an intolerable level of 750° C. from a starting point of 100° C. This represents an amount of work equal to approximately 3,500,000 mkp, equivalent to approximately 63 European horsepower. This doubling of the amount of work performed is very impractical in use and can indeed lead to overloading if not destruction of the brake.

In accordance with the instant invention using a timer circuit 8 such as shown in FIG. 1 it can be seen that the operation of the trailer disk brake 23, assuming continuous operation of the tractor engine brake 19, is broken up into several periods. During each one of these automatic actuation periods the braking force, although 8% at the beginning, will vary between 5% and 10%, with the temperature in the brake rising from a starting temperature of 100° C. to a maximum temperature of 550° C. During such operation the amount of work performed is equal to at most 1,900,000 mkp, the equivalent of approximately 35 European horsepower. In accordance with the instant invention the trailer disk brake 23 is held on for a period of 70 secs, then turned off for 3 secs, and then turned on again cyclically. When the on time is reduced to 30 seconds from 70 seconds the minimum braking retardation force can be reduced to 6.5%, with the maximum resting at 10%.

The system according to the instant invention thereby allows a continuous-duty brake to be used truly continuously. In fact such a brake can be used for many miles on a long downhill run without the operator of the vehicle having to periodically operate the continuous-duty brake himself to allow it to cool off or assist it with the service brake. Thus the likelihood of driver fatigue and accidents is greatly reduced.

I claim:

1. A tractor-trailer air-brake system comprising:
   a tractor engine brake;
   trailer air-powered disk wheel brakes;
   actuator means for energizing said tractor engine brake and thereby braking the tractor of a tractor-trailer having said system;
   means including an electrically operated valve operable between closed and open positions for pressurizing and energizing said trailer brakes on energization of said tractor brake to brake the trailer of said tractor; and
   timer means connected to said valve and to said actuator means for automatically periodically operating said valve to periodically de-energize said trailer brakes even while said tractor brake is energized.

2. The system defined in claim 1 wherein said timer means includes a switch in series with said valve.

3. The system defined in claim 2 wherein said timer means is constituted as a sealed unit.

4. The system defined in claim 1 wherein said timer means operates said valve by maintaining same closed for substantially longer than it maintains said valve open, said trailer brakes being energized when said valve is open.

5. The system defined in claim 4 wherein the ratio between length of time closed and length of time open for said valve is at least 5:1.

6. The system defined in claim 5 wherein said ratio is generally 10:1 and said time open is generally 3 seconds.

7. The system defined in claim 1 wherein said timer means includes an oscillator and a switch in series with said valve whereby said valve is periodically closed by said oscillator.

* * * * *